Patented Aug. 21, 1923.

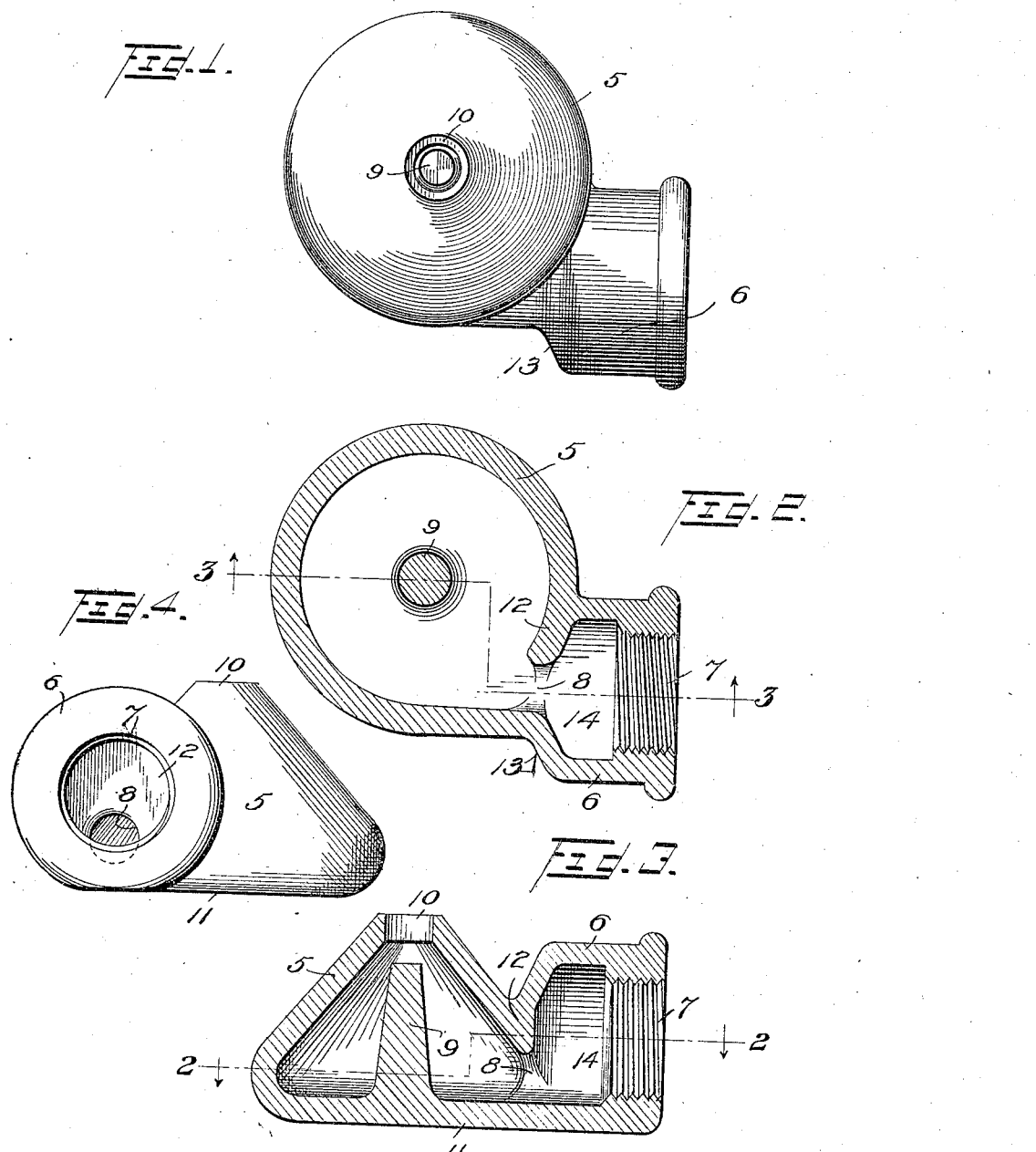

1,465,580

UNITED STATES PATENT OFFICE.

JAMES C. FINDLAY, OF SAN FRANCISCO, CALIFORNIA.

NOZZLE.

Application filed April 15, 1920, Serial No. 374,192. Renewed July 9, 1923.

*To all whom it may concern:*

Be it known that I, JAMES C. FINDLAY, a subject of the King of Great Britain, residing at San Francisco, in the county of San Francisco and State of California, have invented new and useful Nozzles, of which the following is a specification.

This invention relates to nozzles.

The principal object of the invention is to provide a nozzle especially adapted for spraying liquids of greater specific gravity than water, such as the so-called "dipping" fluids.

The present invention is designed to be used in connection with a spraying system such as that described and claimed in my application filed of even date herewith, Serial No. 374,193.

In the spraying systems for which the present nozzle is designed, a pen is provided having a number of these nozzles arranged along the top, sides and bottom of the same, and sheep or cattle are driven into the pen. The dipping fluid is forced through pipe lines to the nozzles which spray the animals on all sides thereof, thus curing diseases which the animals may have and killing all vermin on their bodies. This process is vastly superior to the true dipping operation, wherein the sheep are forcibly immersed in a bath of the dipping fluid. By the use of apparatus employing the present nozzle, a strong penetrating spray, rainlike in nature, is obtained and one which does not become foggy. Nozzles designed to spray water have been found to be useless when spraying dipping fluid because of the greater specific gravity of the latter. On the other hand, nozzles designed for spraying dipping fluid are not useful, ordinarily, to spray water. The nozzle of the present invention breaks up the heavy dipping fluid into a penetrating spray without ever delivering the same in the form of a fine mist or fog.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing,

Fig. 1 is a top plan view of a nozzle constructed in accordance with the present invention.

Fig. 2 is a cross section on the line 2—2 of Fig. 3.

Fig. 3 is a cross section on the line 3—3 of Fig. 2.

Fig. 4 is an end elevation looking from the right-hand side of the nozzle of Fig. 1.

The improved nozzle comprises essentially two parts, namely, a conical portion 5 and a pipe coupling 6. The nozzle is formed of a single casting and the pipe coupling 6 is provided with the usual screw threads 7. An aperture 8 is provided to connect the pipe coupling with the conical portion of the nozzle. The base of the nozzle is flattened as indicated at 11.

Arising from the base of the conical portion and integral therewith is a pin 9, which pin tapers toward its upper end and is there flattened as shown in Fig. 3. The pin 9 is coaxial with the conical portion. The apex of the conical portion is provided with a mouth 10 for the passage of the fluid discharged by the nozzle. The upper end of the pin 9 is located directly below this mouth 10 and the diameter of the mouth is greater than the diameter of the upper end of the pin, as Fig. 3 depicts. The volume of the pin is small as compared to the volume of the chamber formed by the conical portion.

The pipe coupling is offset with respect to the conical portion, as seen in Figs. 1 and 2, an annular shoulder 13 providing a chamber 14 in the interior of the coupling. The wall of the conical portion 5 is extended, as at 12, across the inner end of this chamber and is provided with the aperture 8 in the lower part of the same. This aperture is of small area compared to the internal diameter of the coupling and is arranged tangentially of the walls of the chamber. The aperture is preferably circular and is located centrally of the coupling 6 but on a level with the interior bottom wall of the conical portion.

The fluid enters through the pipe coupling past the aperture 8 into the conical portion 5 in a direction tangential to the walls of the same. The pressure of the fluid carries it out through the mouth 10 past the pin 9 which breaks the fluid up into the desirable penetrating spray.

The device has been designed only after a long series of experiments with a view to determining the best type of nozzle adapted for a liquid of the character of the ordinary dipping fluid. It has been found that small variations in the proportions of the parts make a great difference in the character of the spray. While the present device has been described as designed for dipping solutions, I do not wish to be limited only to the use of such solutions, but desire to employ my nozzle wherever it may be useful.

What is claimed is:

1. In a nozzle for spraying solutions of greater specific gravity than water, a conical portion provided with a conical chamber therein, an offset pipe coupling connected to said portion, an aperture connecting the chamber at the base of the conical portion with the coupling, the aperture being of small area relative to the coupling and arranged tangentially of the walls of the conical chamber, a solid pin rigid with the base of the conical chamber and extending upwardly coaxial with the same, said pin having a flattened end, the volume of the pin being small as compared to the volume of the chamber, and a passageway at the apex of the conical chamber for the fluid to be sprayed, said flattened end of the pin terminating below said passageway.

2. In a nozzle for spraying fluids of greater specific gravity than water, a conical portion provided with a conical chamber therein, a pipe coupling connected to the conical portion, a wall between the conical portion and the coupling, said wall having an aperture at its lowest point, the aperture being located below the central longitudinal line of the coupling and connecting the conical chamber with the coupling, said pipe coupling extending beyond said wall in a direction tangential to the base of the cone, a solid pin integral with said base and tapering upwardly into a flattened end, the volume of the pin being small as compared to the volume of the chamber, and a passageway at the apex of the cone spaced above the end of the pin, said passageway having a circular wall of greater diameter than the flattened end of the pin.

In testimony that I claim the foregoing as my own, I have hereto affixed my signature.

JAMES C. FINDLAY.